United States Patent
Yang (10) Patent No.: US 8,101,051 B2
(45) Date of Patent: Jan. 24, 2012

(54) COMBUSTION GAS GENERATION DEVICE AND ON-VEHICLE COMBUSTION GAS GENERATION DEVICE USING ELECTROLYSIS

(76) Inventor: Binglin Yang, Tokyo (JP)

( * ) Notice: Subject to any disclaimer, the term of this patent is extended or adjusted under 35 U.S.C. 154(b) by 540 days.

(21) Appl. No.: 12/309,097

(22) PCT Filed: Jul. 5, 2007

(86) PCT No.: PCT/JP2007/063455
§ 371 (c)(1),
(2), (4) Date: Jan. 5, 2009

(87) PCT Pub. No.: WO2008/004619
PCT Pub. Date: Jan. 10, 2008

(65) Prior Publication Data
US 2010/0236921 A1  Sep. 23, 2010

(30) Foreign Application Priority Data
Jul. 6, 2006 (JP) .................................. 2006-187245

(51) Int. Cl.
*C25B 9/06* (2006.01)
*C25B 1/06* (2006.01)

(52) U.S. Cl. ........ 204/270; 204/268; 204/278; 205/628; 96/189

(58) Field of Classification Search .................... 96/188, 96/189, 190, 191, 192
See application file for complete search history.

(56) References Cited

U.S. PATENT DOCUMENTS

| | | | | |
|---|---|---|---|---|
| 3,310,483 | A * | 3/1967 | Rhodes | 204/268 |
| 4,014,777 | A * | 3/1977 | Brown | 204/228.5 |
| 4,113,601 | A * | 9/1978 | Spirig | 204/228.5 |
| 4,332,219 | A * | 6/1982 | Gonzalez | 123/3 |
| 4,617,113 | A * | 10/1986 | Christophersen et al. | 209/170 |
| 5,225,060 | A * | 7/1993 | Noaki et al. | 204/237 |
| 5,231,954 | A * | 8/1993 | Stowe | 123/3 |
| 5,614,069 | A * | 3/1997 | Lin | 204/268 |
| 5,667,647 | A * | 9/1997 | Suga et al. | 204/237 |
| 5,831,727 | A * | 11/1998 | Stream | 356/246 |
| 5,985,004 | A * | 11/1999 | Boyd | 95/241 |
| 6,773,561 | B1 * | 8/2004 | Noaki et al. | 204/256 |
| 7,473,339 | B2 * | 1/2009 | D'Ambra et al. | 204/240 |
| 7,947,158 | B2 * | 5/2011 | Hartz et al. | 204/237 |
| 2004/0074781 | A1 * | 4/2004 | Klein | 205/628 |

FOREIGN PATENT DOCUMENTS

| | | |
|---|---|---|
| FR | 2373615 | 7/1978 |
| JP | 63-303087 | 12/1988 |
| JP | 8-144078 A | 6/1996 |
| JP | 3130014 B2 | 11/2000 |
| JP | 2004-137528 A | 5/2004 |
| JP | 2004204347 | 7/2004 |

(Continued)

*Primary Examiner* — Harry D Wilkins, III
(74) *Attorney, Agent, or Firm* — Smyrski Law Group, A P.C.

(57) ABSTRACT

A large amount of a gas mixture of hydrogen and oxygen can be effectively generated over a long time. A positive electrode and a negative electrode are immersed in an electrolytic cell filled with an electrolytic solution, and a DC or AC voltage is applied across the two electrodes. A plurality of intermediate electrodes are arranged between the two electrodes. The electrolytic cell is sealed by a sealing cover. The gas mixture of hydrogen and oxygen generated by electrolysis is taken out through a discharge opening provided in the sealing cover.

9 Claims, 12 Drawing Sheets

FOREIGN PATENT DOCUMENTS

| | | |
|---|---|---|
| JP | 2004-244679 A | 9/2004 |
| JP | 2005029880 | 2/2005 |
| JP | 3112961 U | 7/2005 |
| JP | 2005-232512 A | 9/2005 |
| JP | 2005330514 | 12/2005 |
| RU | 2091507 | 9/1997 |
| SU | 406564 | 11/1973 |
| WO | WO 02/066585 | 8/2002 |

* cited by examiner

FIG. 18

COMBUSTION GAS GENERATION DEVICE AND ON-VEHICLE COMBUSTION GAS GENERATION DEVICE USING ELECTROLYSIS

TECHNICAL FIELD

The present invention relates to a combustion gas generation device and an on-vehicle combustion gas generation device using electrolysis. More particularly, it relates to an improved combustion gas generation device which generates, as a combustion gas, a gas mixture of hydrogen and oxygen obtained by means of electrolysis.

BACKGROUND ART

A technology for generating a large amount of a gas mixture of hydrogen and oxygen; that is, a Brown gas, in a short time by the electrolysis of water to use this gas in a melting furnace, a combustion furnace or the like has already been disclosed in Patent Document 1. Moreover, a Brown gas generator for realizing such a technology is available on the market and, for example, a Brown gas generator manufactured by B.E.S.T. KOREA CO., LTD. is known (www.browngas.com).

Furthermore, a gas generation device suitable for such a Brown gas or an electrolytically generated gas is disclosed in Patent Documents 2 and 3, and structures of an electrolytic cell, a positive electrode, a negative electrode, and an intermediate electrode arranged between the two electrodes are also known.

Patent Document 1: Japanese Patent No. 3130014
Patent Document 2: Japanese Patent Application Laid-Open No. 2004-137528
Patent Document 2: Japanese Patent Application Laid-Open No. 63-303087

DISCLOSURE OF THE INVENTION

In an electrolytic gas generation device heretofore suggested, there has been a problem that a sufficiently satisfactory efficiency cannot be obtained. In consequence, the size of the device usually enlarges and the weight thereof inevitably increases, and such a large-sized device cannot be used as anything other than a stationary combustion gas generation device. That is, it has heretofore been impossible to desire that such a combustion gas generation device be used as a portable type or an on-vehicle power source for a vehicle.

The present invention has been developed to solve the above conventional problem, and it suggests a new mechanism combination for efficiently and continuously generating a large amount of a gas mixture of hydrogen and oxygen by means of electrolysis.

That is, the present invention is based on a finding that, for the efficient electrolyzation of water and the continuous generation of a large amount of a gas, a large voltage must be applied across positive and negative electrodes to increase the density of a current flowing through an electrolytic solution.

Further, in the present invention, a structure for efficiently circulating the electrolytic solution is suggested based on a finding that for the continuous and efficient electrolyzation of water, it is necessary to effectively prevent substances produced from the electrolytic solution by the electrolysis from adhering to the peripheries of the electrodes to lower the efficiency of the electrolysis.

Furthermore, the present inventors have found a problem that a gas mixture of hydrogen and oxygen generated by the electrolysis of water is initially taken out in a mixed state of a gas and a liquid after the generation and the gas mixture in such a state cannot be used as a satisfactory combustion gas, and they have developed a technique of effectively separating the gas and the liquid from each other.

Furthermore, the present invention can provide a device which effectively feeds back the separated liquid to an electrolytic cell to enable a continuous operation with less maintenance over a long time.

The present invention provides an improved combustion gas generation device which has been improved by one or a combination of the above several means for solving the problems to continuously supply a large amount of a gas mixture of hydrogen and oxygen by means of the electrolysis of water.

The invention of claim 1 is characterized by a combustion gas generation device using electrolysis, comprising: an electrolytic cell filled with an electrolytic solution; a positive electrode and a negative electrode immersed in the electrolytic solution in the electrolytic cell; a plurality of intermediate electrodes arranged between the two electrodes so that the intermediate electrodes are insulated from the two electrodes and insulated from the other intermediate electrodes, and configured to receive and divide a voltage across the electrodes; a power source unit which applies a DC or AC voltage across the two electrodes; a sealing cover configured to seal the electrolytic cell and having a discharge opening through which a gas mixture of hydrogen and oxygen generated by the electrolysis is discharged; and a gas-liquid separation unit arranged between the upper part of the electrolytic cell and the sealing cover so that the electrolytic solution is separated from the gas mixture generated in a bubble-like state in the electrolytic cell, the gas-liquid separation unit having a bottomed separation chamber divided into a plurality of chambers by partition walls, the partition walls and the bottoms of the chambers being provided with openings.

The invention of claim 2 is characterized by the combustion gas generation device using the electrolysis which further comprises a cooling unit which includes cooling fins connected to both upper and lower portions of the electrolytic cell and is configured to naturally circulate the electrolytic solution in the electrolytic cell.

The invention of claim 3 is characterized by the combustion gas generation device using electrolysis, further comprising: a second gas-liquid separation unit connected in series to the gas-liquid separation unit so that a liquid content is separated from the gas mixture of hydrogen and oxygen generated from the electrolytic cell.

As described above, in the present invention, water can be electrolyzed with remarkable efficiency to continuously obtain a large amount of the gas mixture of hydrogen and oxygen, and the device can be miniaturized and lightened.

Furthermore, owing to the miniaturization of the combustion gas generation device according to the present invention, the device can be used as an on-vehicle device, and can therefore be used as a vehicle power source.

BEST MODE FOR CARRYING OUT THE INVENTION

Figure 1:
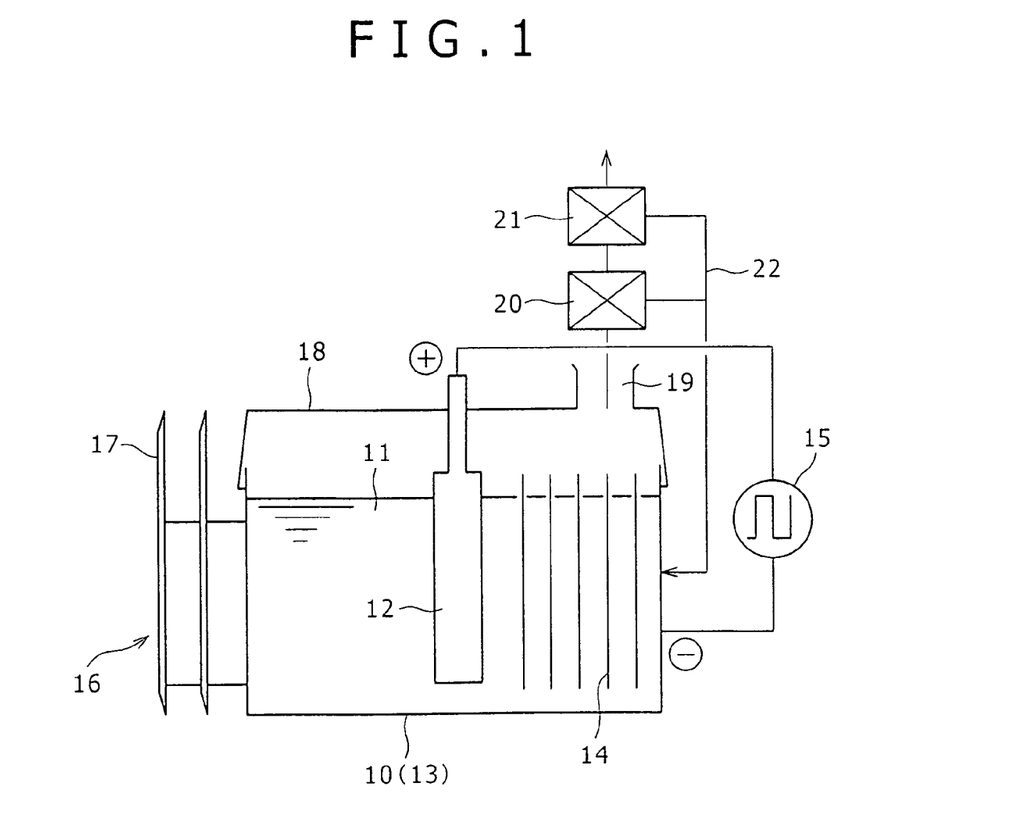
FIG. 1 is a schematic constitution diagram showing a first suitable embodiment of a combustion gas generation device according to the present invention.

FIG. 1 shows a schematic constitution of a suitable first embodiment of a combustion gas generation device according to the present invention.

An electrolytic cell 10 is filled with an electrolytic solution 11 such as sodium hydroxide or potassium hydroxide, and a positive electrode and a negative electrode are immersed in this electrolytic solution 11. In the present embodiment, a positive electrode 12 is made of a metal electrode rod fixed to the approximate center of the electrolytic cell 10, whereas a negative electrode 13 is composed of the electrolytic cell 10 itself.

In an electrode structure of the present invention, a plurality of intermediate electrodes 14 are arranged between the positive electrode 12 and the negative electrode 13 so that the plurality of intermediate electrodes 14 are insulated from the electrodes 12, 13, and the intermediate electrodes 14 themselves are insulated from each other. In consequence, a direct current voltage applied across the positive electrode 12 and the negative electrode 13 is divided by the intermediate electrodes 14, respectively.

To apply the voltage for performing electrolysis across the electrodes 12, 13, a power source unit 15 is connected between the electrodes.

In the present invention, this power source unit 15 applies a DC or AC voltage across the electrodes 12, 13. Instead of a simple continuous direct current voltage, the power source unit 15 in the present invention can supply a pulsed DC or AC voltage to the electrodes 12, 13 to increase the supplied voltage and to also increase the density of a current flowing through the electrolytic solution 11.

Then, according to the present invention, the electrolytic solution 11 can be efficiently electrolyzed by a combination of the above electrode arrangement of the positive electrode 12, the negative electrode 13, and the intermediate electrodes 14 with the power source unit 15 which applies this DC or AC voltage.

As is well known, in the electrolysis of water, a phenomenon occurs in which substances produced from the electrolytic solution adhere to the electrodes to rapidly deteriorate the electrolysis.

To solve this problem, improvement has heretofore been performed by providing an external pump for forcibly circulating the electrolytic solution 11, but such a forced circulation system has involved a problem that energy is lost by the circulation and overall efficiency lowers remarkably.

To eliminate such a problem, the present embodiment is characterized in that the electrolytic cell is provided with a natural-circulation-type cooling unit.

In FIG. 1, the cooling unit is represented by reference numeral 16, and includes cooling fins 17 connected to both upper and lower ends of the electrolytic cell 10. The electrolytic solution 11 in the electrolytic cell 10 is naturally circulated through the cooling fins 17, and cooled outside the electrolytic cell 10, and this solution is returned to the electrolytic cell 10 again to maintain an optimum solution temperature. Moreover, adhesion of electrolytic substances to the peripheries of the electrodes 12 and 13 can be reliably prevented, which would otherwise lower an electrolysis function.

Needless to say, in the present invention, forced circulation may be used instead of such natural circulation performed by the cooling unit 17.

When the DC or AC voltage is applied across the electrodes 12, 13, the combustion gas generation device according to the present invention immediately generates a gas mixture of hydrogen and oxygen. The electrolytic cell 10 is provided with a sealing cover 18 fixed in an airtight state to seal the electrolytic cell so that this gas mixture is not released to the atmosphere. This sealing cover 18 is provided with a discharge opening 19, and the gas mixture generated by the electrolysis passes through this discharge opening 19 and is guided to the outside.

In the present invention, the generation of the gas mixture is performed remarkably quickly. The generation of the gas mixture by the electrolysis is started within one minute from power supply, and this gas generation continues, so that a large amount of the gas mixture can be generated continuously. Since the gas is generated rapidly, the gas mixture is mixed with the electrolytic solution and is guided in a bubble-like state externally through the discharge opening 19. Therefore, the gas in this gas-liquid mixed state cannot be used as a combustion gas as is. Therefore, in the present invention, to separate the liquid content from the gas mixture, at least two stages of gas-liquid separation units 20, 21 are connected in series. The solution separated by the respective gas-liquid separation units 20, 21 is returned to the electrolytic cell 10 through a return path 22.

Therefore, according to the present invention, even when the device is operated continuously, an electrolyte hardly decreases, and only water decomposed as the gas mixture is replenished, so that the continuous generation of the gas mixture can be continued.

Figure 2:
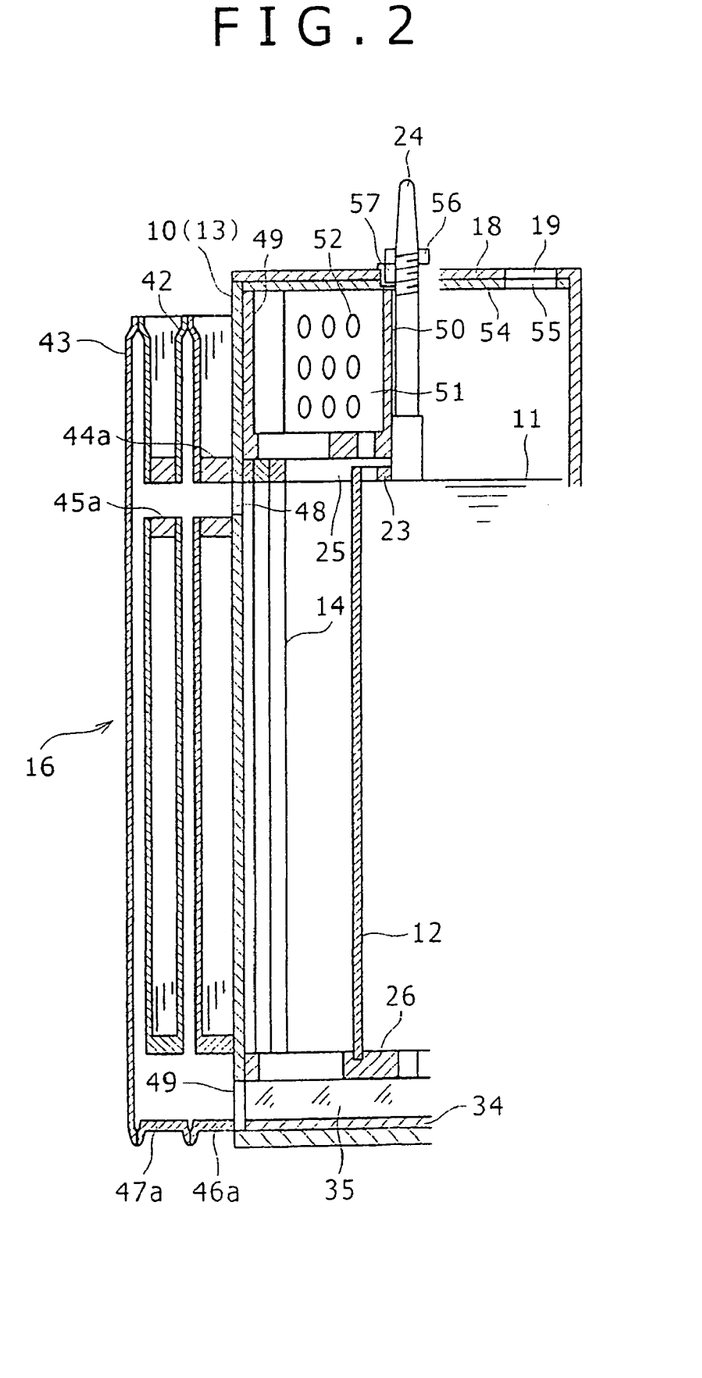
FIG. 2 is a sectional view showing a main part of the combustion gas generation device in FIG. 1.

FIG. 2 further specifically shows a main part of the combustion gas generation device according to the preferable first embodiment of the present invention shown in FIG. 1.

In this embodiment, the electrolytic cell 10 is constituted of a vertically-long, bottomed cylindrical metal member, and also serves as the negative electrode 13. In the embodiment, the electrolytic cell 10 is filled with the electrolytic solution 11; for example, sodium hydroxide or the like, and the positive electrode 12 is immersed in this electrolytic solution 11 and fixed in the electrolytic cell 10. The positive electrode 12 is constituted of a metal cylinder, and the upper end of the positive electrode is integrally connected to an electrode terminal 24 via a flange 23.

To fixedly arrange the positive electrode 12 in the electrolytic cell 10, an upper fixing plate 25 and a lower fixing plate 26 are arranged on the upper and lower ends of the positive electrode 12 in the electrolytic cell 10.

Figure 3:
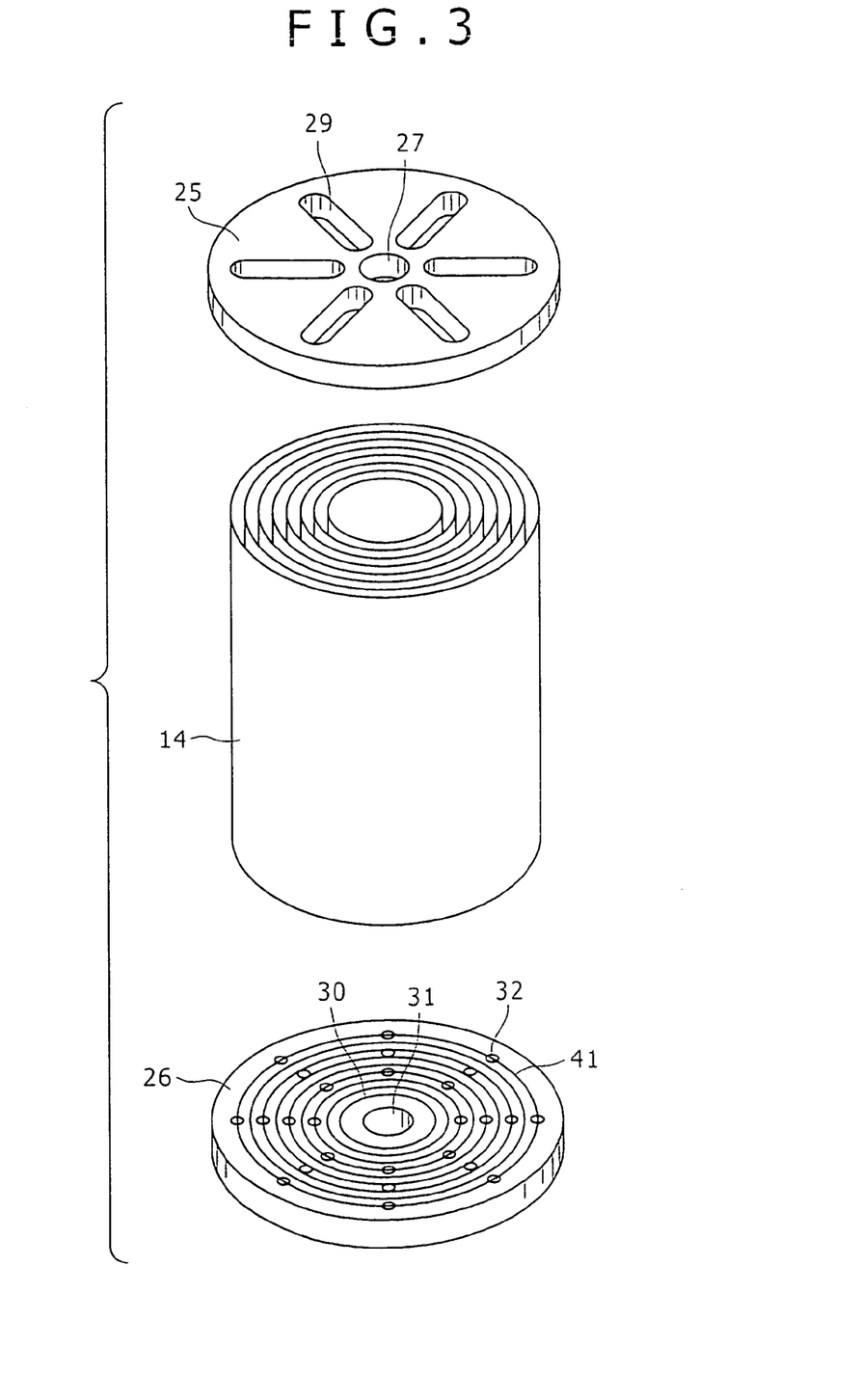
FIG. 3 is a perspective view showing a main part of a support structure of intermediate electrodes 14 in FIG. 2.
Figure 4:
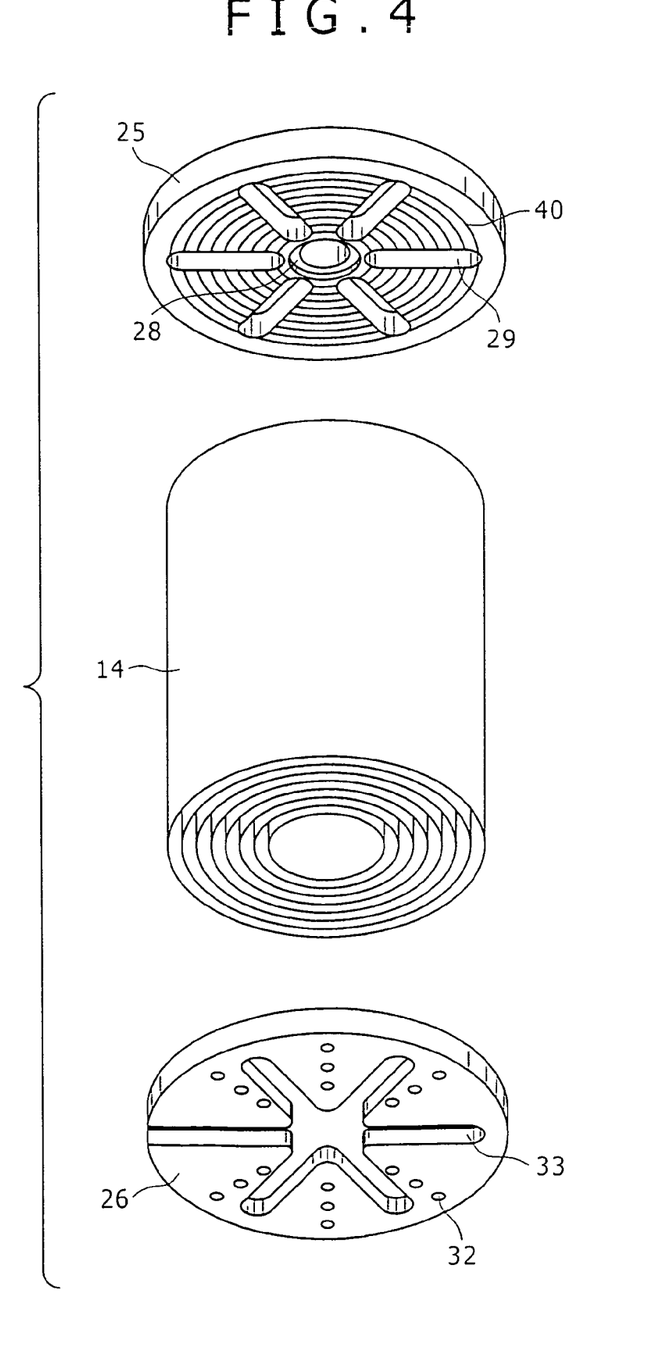
FIG. 4 is a perspective view showing a main part of a support structure of the intermediate electrodes 14 in FIG. 2, as in FIG. 3.

FIGS. 3, 4 show details of the upper fixing plate 25 and the lower fixing plate 26 of the positive electrode 12 shown in FIG. 2, and these fixing plates 25, 26 are formed of an insulating material for arranging the electrodes in an insulated state; for example, plastic, Teflon (registered trademark), a ceramic material, or the like.

The center of the upper fixing plate 25 is provided with a through hole 27 through which the electrode terminal 24 of the positive electrode 12 extends, and the bottom surface of the upper fixing plate 25 is provided with a columnar groove 28 which receives the flange 23 connecting the positive electrode 12 to the electrode terminal 24, so that the positive electrode 12 is integrally, firmly connected to the upper fixing plate 25. The upper fixing plate 25 is provided with six elongated holes 29 disposed at equal intervals along a radial direction, and the gas mixture of hydrogen and oxygen generated by the electrolysis is mixed with the electrolytic solution and is discharged in a bubble-like state to the upper part of the electrolytic cell 10 through the elongated holes 29.

On the other hand, the lower fixing plate 26 is also formed of an electric insulating material, and the lower end of the positive electrode 12 is supported by an annular electrode support groove 30 provided in the upper surface of the plate.

Moreover, the center of the lower fixing plate 26 is provided with a through hole 31, and a plurality of small through holes 32 are radially provided in the diametric direction of the lower fixing plate 26 so as to extend through the plate, so that the electrolytic solution 11 in the electrolytic cell 10 can move through the lower fixing plate 26.

As apparent from FIG. 4, the back surface of the lower fixing plate 26 is provided with six grooves 33 radially provided in the diametric direction, so that the moving of the electrolytic solution 11 is facilitated, and foreign matter generated by the electrolysis, mixed dust, and the like can be received in the grooves 33.

The lower fixing plate 26 is mounted on a disc-like grating 34 arranged in the bottom part of the electrolytic cell 10. In this state, a part of the grooves 33 extends laterally along the lower fixing plate 26 to form openings 35, thereby forming a path to the cooling unit described later.

In the present embodiment, the electrolytic cell 10 itself serves as the negative electrode 13, and the DC or AC voltage is applied across the negative electrode 13 and the positive electrode 12.

The voltage to be applied at this time is arbitrarily selected from a range of 6 to 200 volts, and a current flowing through the electrolytic solution 11 at this time reaches 10 to 400 amperes.

Moreover, in the present invention, the alternating frequency of the voltage to be applied is set to a range of 10 Hz to 40 kHz.

Therefore, according to the present invention, a high voltage and a high current can be applied across the positive and negative electrodes 12, 13, remarkably efficient electrolysis can be performed continuously, and eventually the gas generation device can be miniaturized and lightened.

When the high voltage and the high current are simply applied across the positive and negative electrodes 12, 13 as described above, by means of the rapid electrolysis, the electrolytic solution is intensely electrolyzed locally to generate an uneven region in the electrolytic solution 11, which lowers the whole electrolysis efficiency.

In the present invention, to prevent the generation of such uneven distribution, a plurality of intermediate electrodes 14 are provided between the positive electrode 12 and the negative electrode 13; that is, the electrolytic cell 10, so that the electrolysis can be performed evenly in the electrolytic cell 10.

In FIGS. 2 to 4, in the present embodiment the intermediate electrodes are denoted with reference numeral 14, and the electrodes are formed as a plurality of concentric metal cylinders. As shown in detail in FIGS. 3, 4, the plurality of intermediate electrodes are fitted into a plurality of intermediate electrode support grooves 40, 41 provided in the bottom surface and the upper surface of the upper fixing plate 25 and the lower fixing plate 26, respectively, and the plurality of intermediate electrodes 14 are arranged in the electrolytic cell 10 in a state in which the intermediate electrodes 14 are insulated from the positive electrode 12 and the negative electrode 13 and the intermediate electrodes 14 are also insulated from each other in the electrolytic cell 10.

When the plurality of intermediate electrodes 14 are arranged, the electrolytic solution 11 is separated between the adjacent electrodes, and the applied voltage is also divided by each pair of separated electrodes. Therefore, the local generation of the rapid electrolysis is prevented, and a stable electrolysis function can be obtained over the entire region of the electrolytic solution 11.

As described above, according to the present invention, the electrolysis can be performed efficiently to continuously generate a large amount of the gas mixture of hydrogen and oxygen, but to further improve the efficiency of the electrolysis, provision of the cooling unit in the gas generation device is effective.

That is, according to the experiment performed by the present inventors, it has been found that when the temperature of the electrolytic solution is preferably set to about 50 to 80° C., the electrolysis is performed most efficiently in a case where sodium hydroxide is used as the electrolytic solution.

For this purpose, in the present embodiment, the cooling unit 16 for air cooling by natural circulation is provided outside the electrolytic cell 10.

Furthermore, according to this natural-circulation-type cooling unit 16, the electrolytic solution 11 is successively moved in the electrolytic cell 10, and this natural circulation can reliably prevent adhesion of substances produced during the electrolysis to the respective electrodes 12, 13 to lower the electrolysis function.

Figure 5:
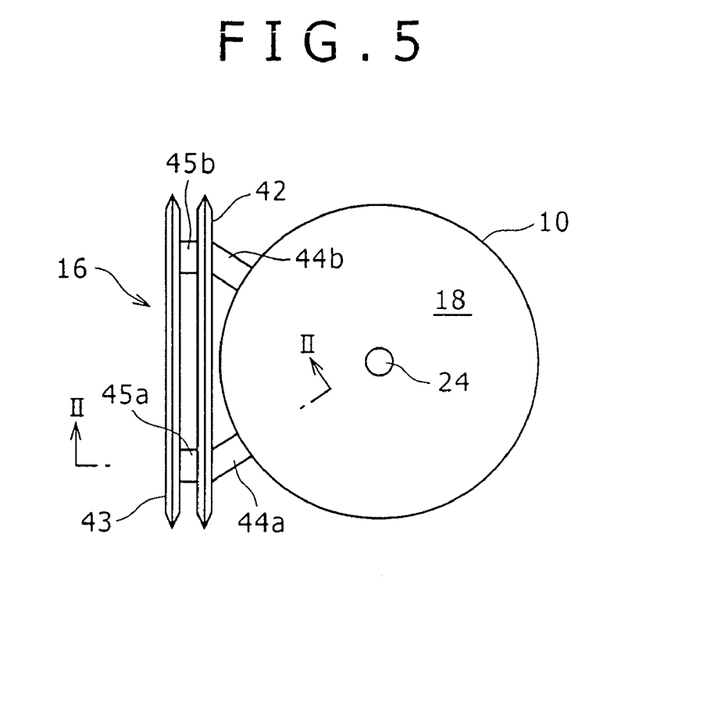
FIG. 5 is a plan view showing a relation between an electrolytic cell and a cooling unit in the first embodiment.

In this cooling unit, two flat-plate-like fins 42, 43 are basically arranged in parallel with the outer periphery of the electrolytic cell 10, the upper end of the unit is connected to the upper end of the electrolytic cell 10 via paths 44a, 44b, 45a and 45b, and the lower ends are similarly connected to each other via paths 46a, 46b, 47a and 47b. Openings 48, 49 can be provided in the electrolytic cell 10 so as to face these paths, thereby forming a natural-circulation-type water cooling path so that the electrolytic solution 11 in the electrolytic cell 10 is guided from the upper part of the electrolytic cell to the cooling fins 42, 43 to flow into the lower part of the electrolytic cell 10 from the respective fins 42, 43.

In the present invention, this cooling unit 16 is not necessarily required, and even when the cooling unit 16 is not provided, a satisfactory electrolysis function can be obtained as compared with a conventional device. However, when this cooling unit 16 is provided, it is possible to obtain a double effect that the above optimum temperature conditions are maintained and that the circulation of the electrolytic solution 11 does not lower the electrolysis efficiency, and the usefulness of the device can be remarkably improved.

An arbitrary number of the intermediate electrodes 14 may be arranged, but in the present embodiment, distance between adjacent electrodes is set to a range of 1 mm to 20 mm in accordance with the size of the electrolytic cell 10.

In the present invention, to achieve efficient electrolysis, it is useful to dispose a proportionality relation between this inter-electrode distance and the alternating frequency of the DC or AC voltage.

That is, as the inter-electrode distance is large, the alternating frequency can be increased to maintain the optimum value of the electrolysis efficiency.

In consequence, there are great advantages that the optimum temperature can be maintained by the above-mentioned function of the cooling unit 16 and that no chemical substance that disturbs the electrolysis is accumulated around the electrodes.

As described above, according to the present invention, the electrolysis can be performed with the high voltage and the high current to efficiently and continuously generate a large amount of the gas, but the generated gas is mixed with the solution and discharged in a bubble-like state from the electrolytic cell, and the gas in a solution-containing state cannot be used as is as the combustion gas. In the present invention, such a solution-mixed gas is subjected to static gas-liquid separation without application of any external power, whereby the combustion gas can be taken out efficiently.

For this purpose, in the present invention, at least two stages of gas-liquid separation units connected in series are provided so as to separate the liquid content from the gas mixture of hydrogen and oxygen generated from the electrolytic cell 10.

In the present embodiment, the first-stage gas-liquid separation unit is arranged in the upper part of the electrolytic cell 10. This first gas-liquid separation unit separates the gas mixture generated in the bubble-like state in the electrolytic cell 10 from the electrolytic solution, and has a bottomed cylindrical plastic separation chamber 49 shown in FIG. 6. This separation chamber 49 has a through hole 50 in the center thereof, and the electrode terminal 24 of the positive electrode 12 extends through this through hole 50.

The inside of the separation chamber 49 is divided into six chambers, and a partition wall 51 is provided between the chambers. Each of the partition walls 51 is provided with a plurality of openings 52, and the bottom of the separation chamber 49 is provided with an opening 53 for each chamber as shown in FIG. 6.

Moreover, the upper surface of the separation chamber 49 is provided with a separation lid 54 constituted of a plate of an insulating material for sealing the separation chamber 49, and the gas mixture from which many liquid components have been removed is taken out through an opening 55 provided in this separation lid 54.

As is apparent from FIG. 2, the sealing cover 18 for sealing the electrolytic cell 10 is fixed to the upper part of this separation lid 54, and the gas mixture is taken out from the electrolytic cell 10 through the discharge opening 19 provided in a position corresponding to the opening 55.

Figure 6:
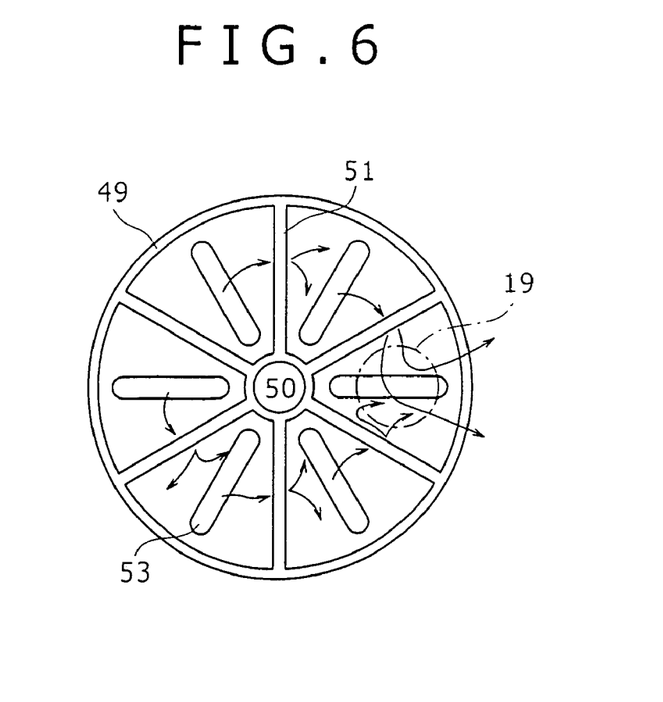
FIG. 6 is a plan view showing details of a first gas-liquid separation unit in the first embodiment.

Arrows of FIG. 6 indicate paths along which the gas-liquid mixture guided to the first gas-liquid separation chamber 49 passes through the openings 52 of each partition wall 51 and is discharged through the discharge opening 19. It is understood that every time the gas-liquid mixture passes through a chamber, the direction of the gas-liquid mixture is diffused, the liquid components drop down from the bottom part of the separation chamber 49 into the electrolytic cell 10, and the gas-liquid separation is effectively performed.

The electrode terminal 24 of the positive electrode 12 extends through the sealing cover 19 to protrude upwards, and is firmly fixed to the sealing cover 19 with a closing nut 56, and a gap between the electrode terminal 24 and the sealing cover 19 is air-tightly closed by an airtight closing portion 57 by means of an O-ring or the like.

As described above, the first gas-liquid separation unit is provided in the upper part of the electrolytic cell, but in the present embodiment, a plurality of stages of multistage gas-liquid separation units are further arranged outside the electrolytic cell 10.

Figure 7:
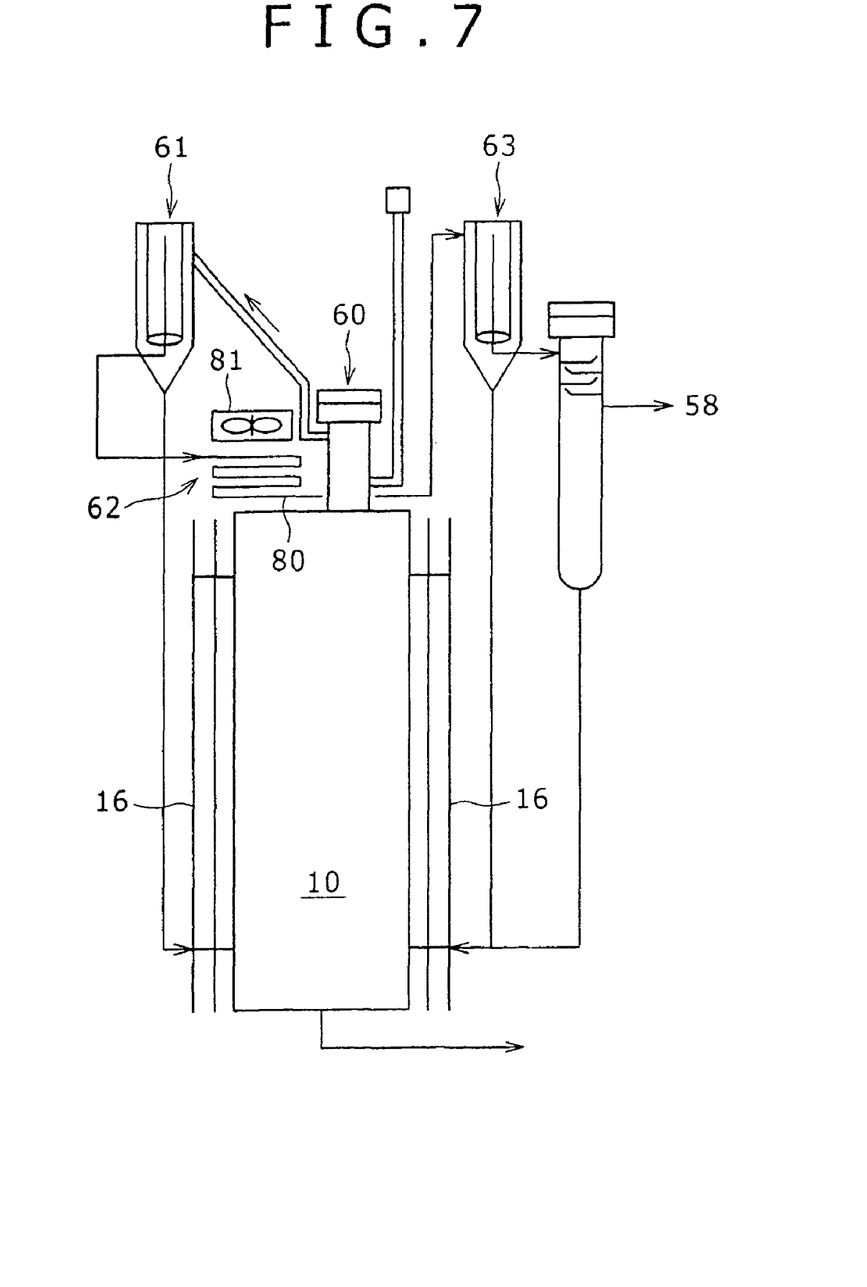
FIG. 7 is a schematically explanatory view showing a multistage gas-liquid separation unit provided outside the electrolytic cell in the first embodiment.

FIG. 7 shows the entire constitution of the present embodiment. Five stages of gas-liquid separation units are provided outside the electrolytic cell 10, whereby a dried gas mixture which is immediately usable for combustion can be obtained through a final discharge opening 58.

In FIG. 7, the gas-liquid separation units to be arranged outside the electrolytic cell 10 include a second gas-liquid separation unit 60, a third gas-liquid separation unit 61, a fourth gas-liquid separation unit 62, a fifth gas-liquid separation unit 63 and a sixth gas-liquid separation unit 59, and the gas mixture is guided from the electrolytic cell 10 to the final discharge opening 58 through these units in this order.

Figure 8:
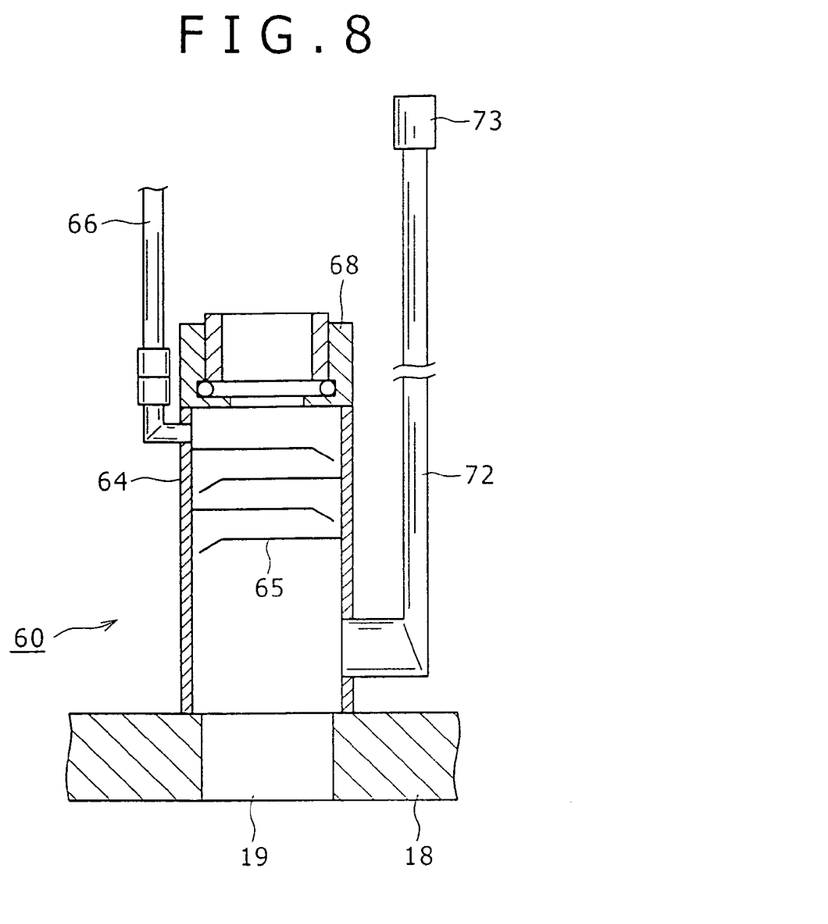
FIG. 8 is a sectional view showing a main part of a second gas-liquid separation unit in the first embodiment.

FIG. 8 shows a preferable example of the second gas-liquid separation unit 60 in the present embodiment.

Onto the sealing cover 18 of the electrolytic cell 10, a second gas-liquid separation chamber 64 is fixed so as to correspond to the discharge opening 19. This separation chamber 64 has a substantially cylindrical shape, a plurality of baffle plates 65 are arranged in the upper part of the chamber, and the side wall of the upper part of the chamber is provided with a conduit pipe 66.

Figure 9:
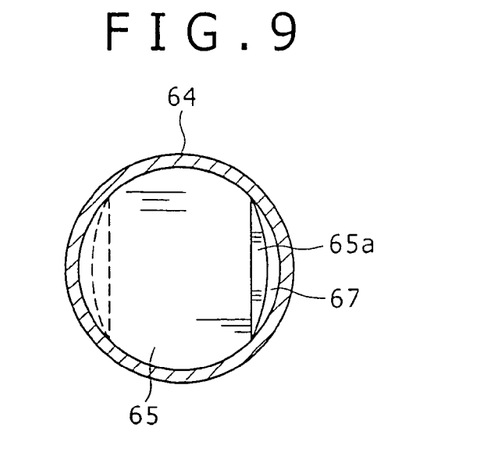
FIG. 9 is a plan view showing the inside of a gas-liquid separation chamber in FIG. 8.

FIG. 9 shows a schematic diagram of the baffle plate 65 provided in the second gas-liquid separation chamber 64. The outer periphery of each baffle plate 65 is fixed to the inner wall of the second gas-liquid separation chamber 64, a part 65a of the plate is bent downward, a gap 67 is provided between the part and the second gas-liquid separation chamber 64, and the gas mixture successively rises from this gap to the conduit pipe 66. As described above, the gas mixture at a temperature around about 65° C. is discharged from the electrolytic cell 10, but the second gas-liquid separation chamber 64 is substantially maintained at ordinary temperature. In consequence, the highly humid gas mixture is cooled by the baffle plates 65, and the liquid content is separated from the gas mixture.

Figure 10:
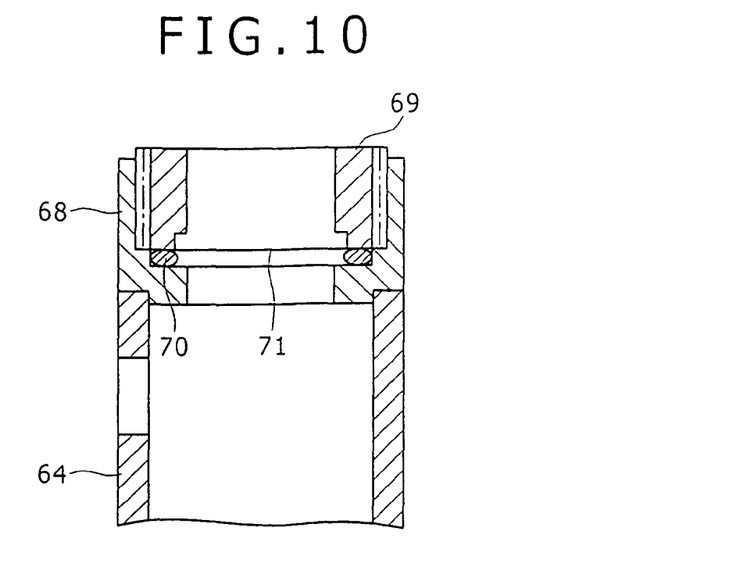
FIG. 10 is a sectional view showing a main part of an explosion-proof unit provided on the second gas-liquid separation unit in the first embodiment.

Moreover, the second gas-liquid separation unit 60 is characterized in that an explosion-proof mechanism is also provided on the separation chamber 64. This explosion-proof mechanism is shown in detail in FIG. 10. The mechanism is constituted of an outer ring 68 fixed to the upper part of the second gas-liquid separation chamber 64 and an inner ring 69 into which this outer ring is screwed. Moreover, a thin metal plate 71 is sandwiched between the rings 68 and 69 via an O-ring 70. Therefore, according to this explosion-proof mechanism, the thin metal plate 71 usually air-tightly seals the second gas-liquid separation chamber 64, but when pressure is applied from one of the directions of both surfaces of this metal thin plate 71, the thin metal plate is detached or broken by a predetermined pressure or more, and the pressure can be released from the second gas-liquid separation chamber 64. In the case of the gas mixture of hydrogen and oxygen, both phenomena occur; i.e., the explosion of hydrogen and so-called implosion in which hydrogen reacts with oxygen and returns to water. In the case of the explosion, the thin metal plate 71 breaks outward. Conversely, in the case of the implosion, the thin plate breaks inward to equalize the pressure. In any case, the second gas-liquid separation chamber 64 can effectively absorb the explosion or the implosion. It is to be noted that when the metal thin plate 71 is slightly scratched, the plate can easily break.

In FIG. 8, one end of a water injection tube 72 is fixed to the lower side wall of the second gas-liquid separation chamber 64, and the other end of water injection tube is provided with a water injection lid 73. In the present invention, the multistage gas-liquid separation unit operates so as to return the separated liquid to the electrolytic cell 10. Therefore, even when the gas generation device is operated for a long time to generate a large amount of a gas mixture by the electrolysis, no electrolyte leaks from the device. In consequence, according to the present invention, only water may be replenished from the outside, and necessary water is replenished by the water injection tube 72 shown in FIG. 8.

Figure 11:
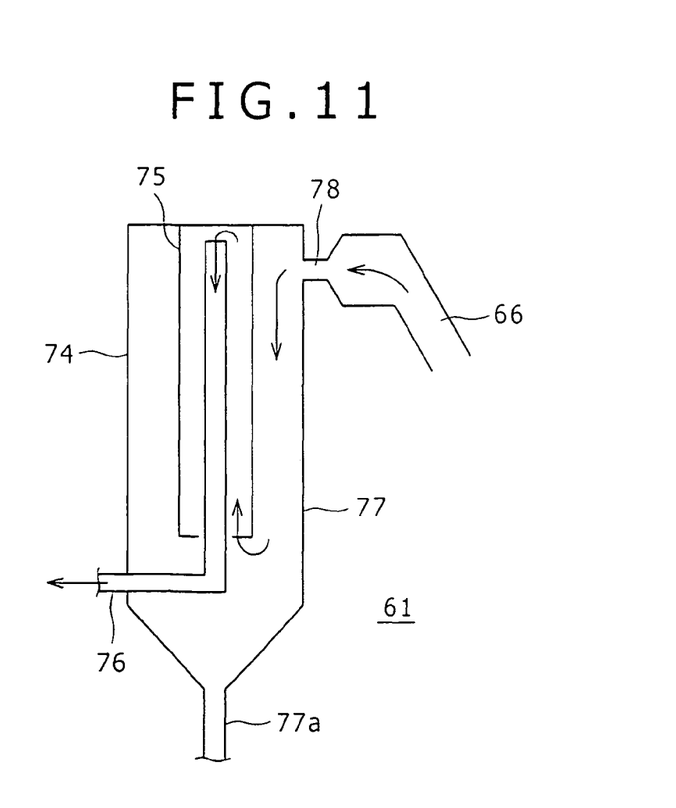
FIG. 11 is a schematically explanatory view showing a third gas-liquid separation unit in the first embodiment.

FIG. 11 shows the third gas-liquid separation unit 61, wherein a separation chamber 74 has a double cylindrical shape, and the upper part of the chamber is closed. Moreover, a fine extraction tube 76 is inserted into an inner cylinder 75, and one end of this extraction tube 76 opens in the upper part of the inner cylinder 75. Furthermore, the lower end of an outer cylinder 77 of the separation chamber 74 is a funnel-like fine tube 77a, and this fine tube 77a extends through the cooling fin and is connected to the electrolytic cell 10 as shown in FIG. 7. Meanwhile, the distal end of the conduit pipe 66 opens in the upper part of the outer cylinder 77 via a diaphragm 78, and the gas mixture is jetted from this diaphragm into the outer cylinder 77, and passes through the inner cylinder 75 to reach the extraction tube 76. In this process, the liquid is further separated from the gas mixture and is returned to the electrolytic cell 10.

Figure 12:
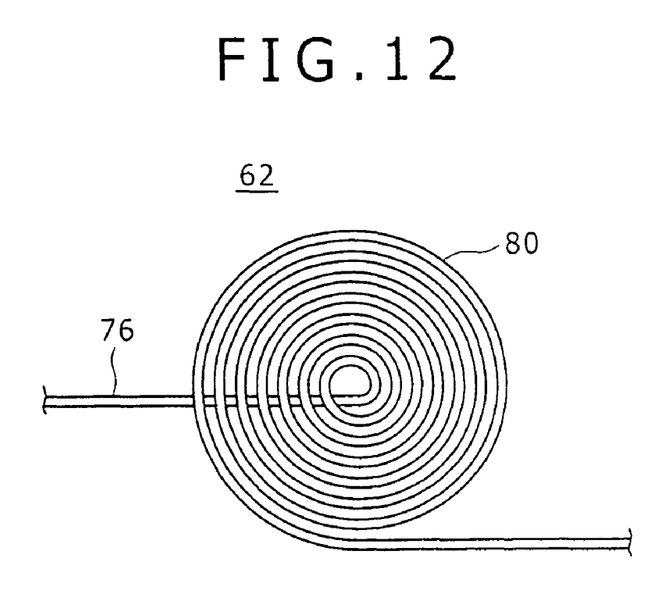
FIG. 12 is a plan view showing a dehumidifier tube of a fourth gas-liquid separation unit in the first embodiment.

The fourth gas-liquid separation unit 62 is a device which dehumidifies the gas mixture, and a spiral dehumidifier tube 80 is connected to the distal end of the extraction tube 76 as shown in FIG. 12. A cooling fan 81 is provided on the upper side of this dehumidifier tube 80, the gas mixture is dehumidified in the dehumidifier tube 80, and a liquid content generated at this time is returned through a drain pipe provided in a gas mixture passage to the electrolytic cell 10.

Figure 13:
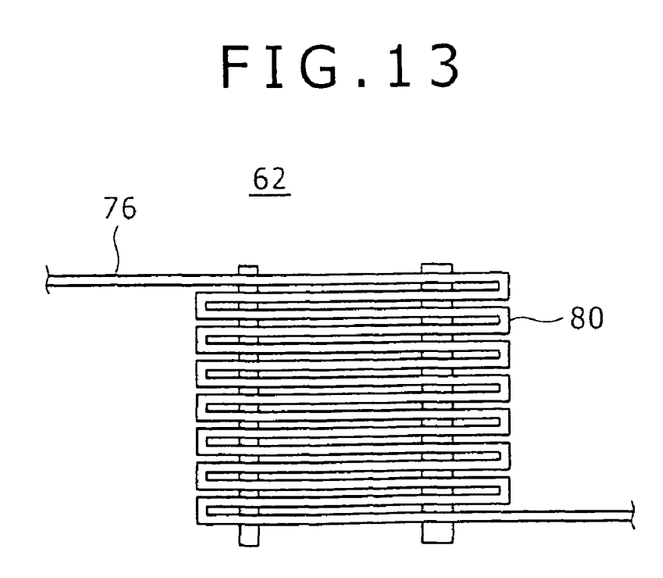
FIG. 13 is a plan view showing another dehumidifier tube of the fourth gas-liquid separation unit in the first embodiment.

FIG. 13 shows another example of the fourth gas-liquid separation unit 62. In this example, unlike the example of FIG. 12, the dehumidifier tube 80 has a bent shape close to a rectangular shape. Cool air is given even to the dehumidifier tube 80 of FIG. 13 to perform a desired dehumidifying function in the same manner as in the circular dehumidifier tube 80 of FIG. 12.

Figure 14:
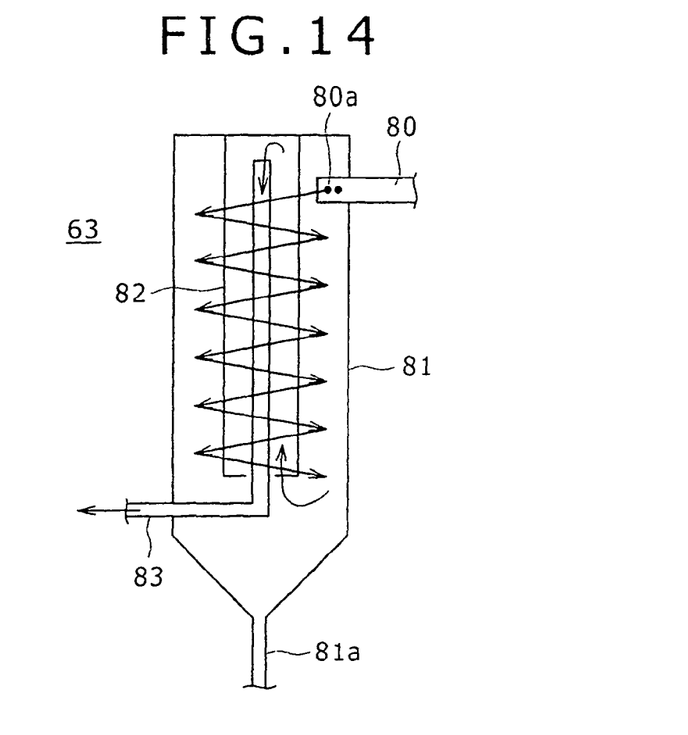
FIG. 14 is an explanatory view showing a schematic constitution of a fifth gas-liquid separation unit in the first embodiment.

FIG. 14 shows the fifth gas-liquid separation unit 63 in the embodiment of the present invention. A structure of this unit 63 is similar to the third gas-liquid separation unit, and the unit includes a double cylinder constituted of an outer cylinder 90 and an inner cylinder 91, and an extraction tube 92. Then, the dehumidified liquid is returned through a fine tube 90a to the electrolytic cell 10.

The fifth gas-liquid separation unit 63 differs from the third gas-liquid separation unit 61 in that the distal end of the dehumidifier tube 80 is inserted into the outer cylinder 90, and the gas mixture is jetted slightly downwards along the inner surface of the outer cylinder 90 through a lateral hole 80a provided in the distal end of this dehumidifier tube 80. In consequence, as shown in the drawing, the gas mixture moves in the outer cylinder 90 while spirally flowing downwards, further passes through the inner cylinder 91, and is guided to the extraction tube 83. Therefore, according to this structure, the gas mixture having a high degree of dryness can be obtained.

Figure 15:
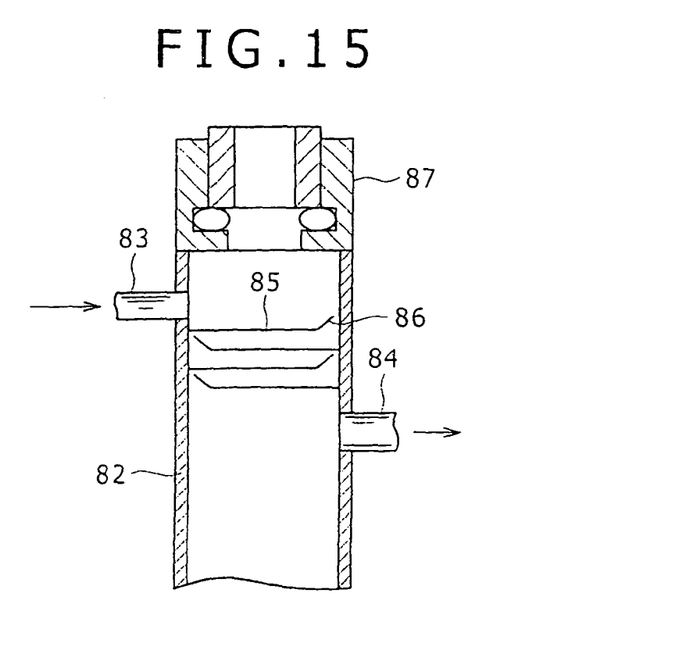
FIG. 15 is a schematically sectional view showing a sixth gas-liquid separation unit in the first embodiment.

FIG. 15 shows the sixth gas-liquid separation unit 59. The structure of the unit is similar to the second gas-liquid separation unit 60, but is different from the second gas-liquid separation unit 60 in that a gas inlet path is provided in the upper part of a separation chamber 93, and the gas mixture is discharged through the lower part. In FIG. 15, an inlet tube is denoted by reference numeral 92, and an outlet tube is denoted by reference numeral 84. Owing to such inlet and outlet path position differences, in the sixth gas-liquid separation unit 59, a bent portion 86 of a baffle plate 85 is directed upwards. Even in the sixth gas-liquid separation unit, an explosion-proof mechanism 87 is provided on the upper side of this gas-liquid separation chamber 85 in the same manner as in the second gas-liquid separation unit. A liquid content discharged from the sixth gas-liquid separation unit is also returned to the electrolytic cell 10 via the cooling fins.

As described above, by use of the multistage gas-liquid separation unit, the discharged gas mixture keeps a remarkably high degree of dryness, and this mixture can immediately be used as the combustion gas.

Figure 16:
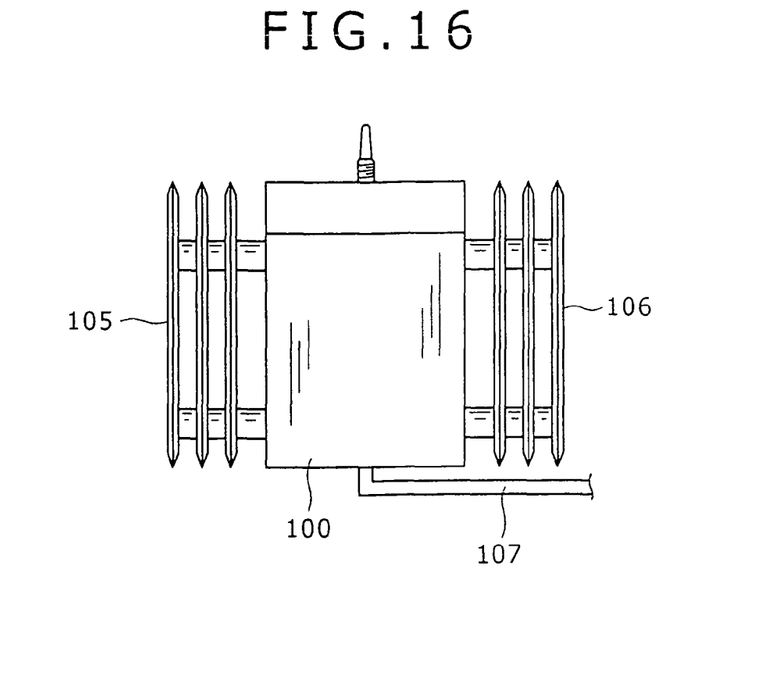
FIG. 16 is a schematic constitution diagram showing a suitable embodiment of an on-vehicle combustion gas generation device according to the present invention.
Figure 17:
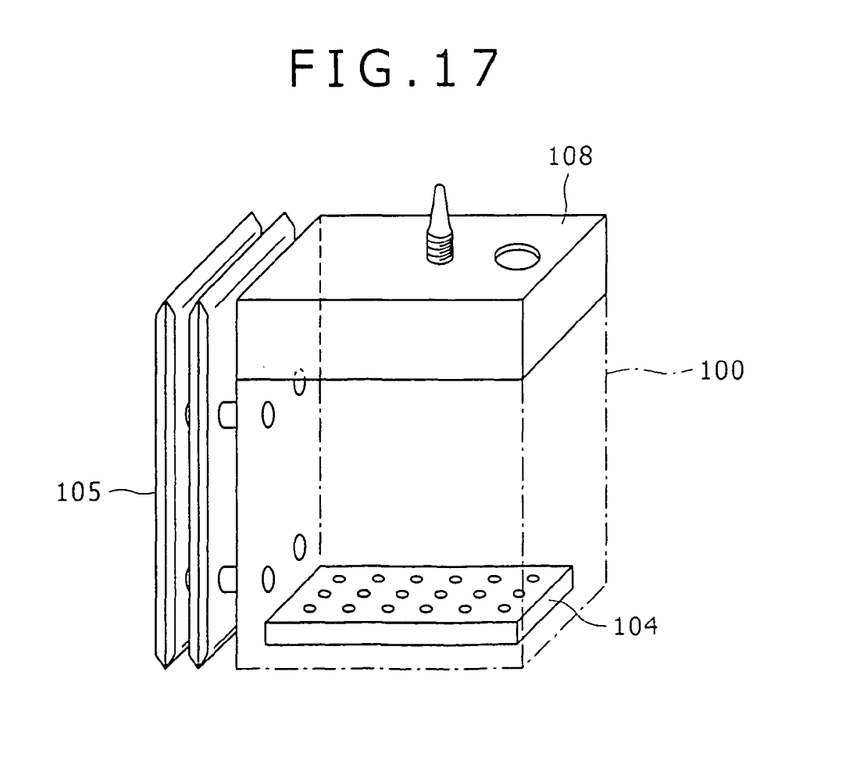
FIG. 17 is a perspective view showing a main part of an electrolytic cell of the second embodiment of FIG. 16.
Figure 18:
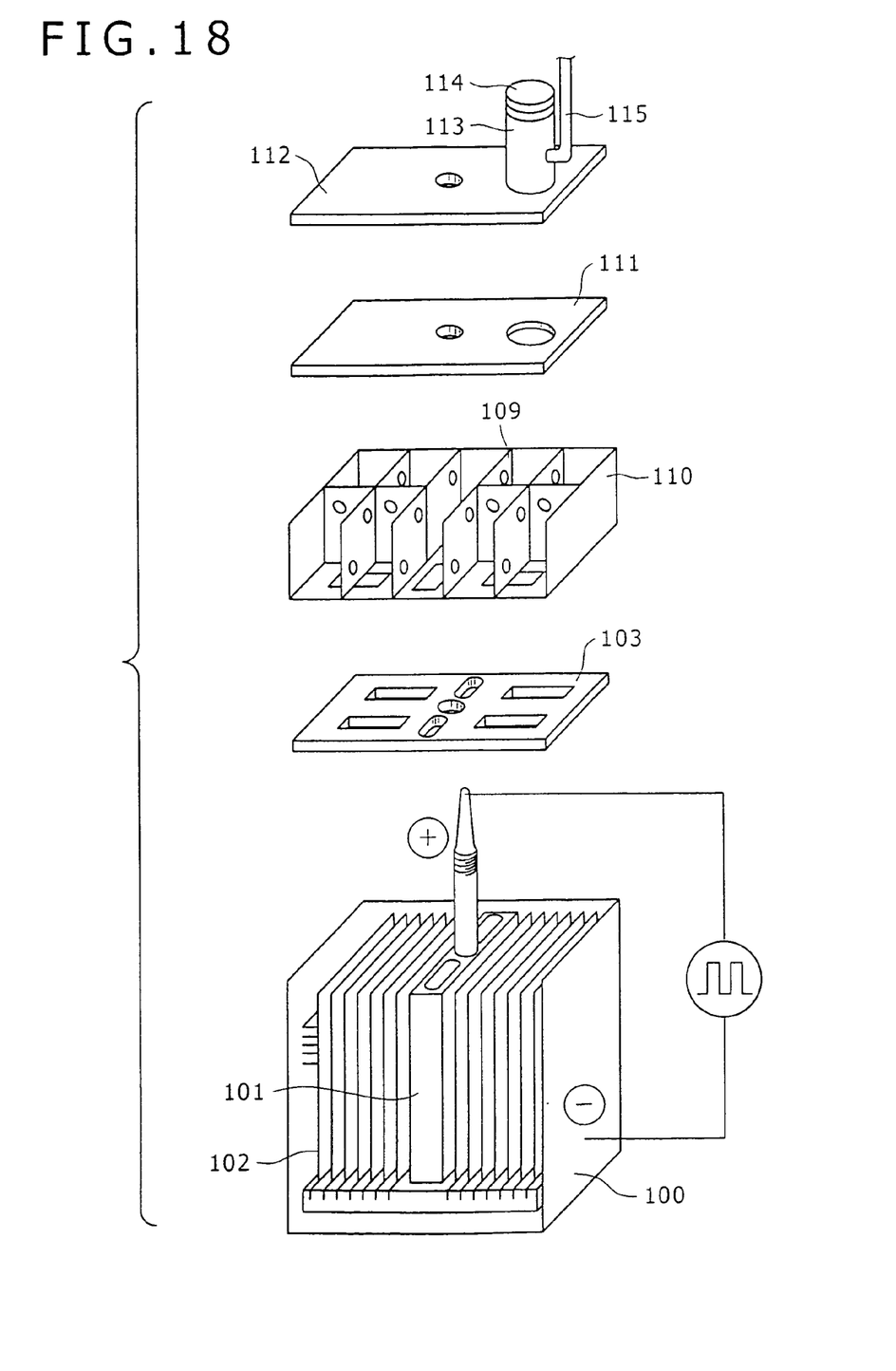
FIG. 18 is an exploded perspective view showing an inner structure of the electrolytic cell in FIG. 17.

FIGS. 16, 17, and 18 show an embodiment as a configuration suitable for mounting the combustion gas generation device according to the present invention on a vehicle. The device basically has a rectangular box-like shape.

Even this second embodiment is completely similar to the first embodiment in principle. However, since the second embodiment has the rectangular box-like shape, the device can be installed in an engine compartment instead of, for example, an on-vehicle battery or the like, and the device also has an advantage that space utilization at a time when the device is mounted on the vehicle is high as compared with the columnar shape as in the first embodiment.

An electrolytic cell 100 serves as a negative electrode, and a power source unit 116 applies a DC or AC voltage across the electrolytic cell and a positive electrode 101. Moreover, a plurality of rectangular intermediate electrodes 102 are arranged in the electrolytic cell 100.

A plurality of cooling fins 105, 106 are provided by the side of the electrolytic cell 100 on both sides, respectively, whereby the optimum temperature of an electrolytic solution in a range of 50 to 80° C. is maintained. Moreover, when the electrolytic solution is naturally circulated, a product generated by electrolysis and accumulated around the electrodes is prevented from disturbing an electrolysis function.

Moreover, if necessary, water is discharged from the bottom part of the electrolytic cell 100 by a discharge pipe 107, and at this time, dust accumulated in the bottom part of the electrolytic cell 100 can be removed. A first gas-liquid separation unit 108 is disposed in the upper part of the electrolytic cell 100. This first gas-liquid separation unit 108 is also divided into a plurality of small chambers by partition walls 109. When a bubble-like gas mixture generated by the electrolysis passes through the respective chambers, gas-liquid separation is performed to discharge the gas mixture.

The first gas-liquid separation unit includes a separation chamber 110 and a separation lid 111, a sealing cover 112 which air-tightly seals the electrolytic cell 100 is further provided on the separation lid 111, and a second gas-liquid separation unit 113 is fixed to this sealing cover. The upper part of this second gas-liquid separation unit 113 is provided with an explosion-proof unit 114, and the lower part of the second gas-liquid separation unit is connected to a water injection pipe 115.

In the second embodiment, two stages of gas-liquid separation units are only shown, but a multistage gas-liquid separation unit may further be connected in the same manner as in the first embodiment.

As described above, according to the present invention, the electrolysis can be performed with the high voltage and the high current to continuously generate a large amount of a gas mixture of hydrogen and oxygen. Therefore, the device can be miniaturized and lightened, and can be used as an on-vehicle or mobile combustion gas generation device.

The invention claimed is:

1. A combustion gas generation device using electrolysis, comprising:
   an electrolytic cell filled with an electrolytic solution;
   a positive electrode and a negative electrode immersed in the electrolytic solution in the electrolytic cell;
   a plurality of intermediate electrodes arranged between the two electrodes so that the intermediate electrodes are insulated from the two electrodes and insulated from the other intermediate electrodes, and are configured to receive and divide a voltage across the two electrodes;
   a power source unit which applies a DC or AC voltage across the two electrodes;
   a sealing cover configured to seal the electrolytic cell and having a discharge opening through which a gas mixture of hydrogen and oxygen generated by the electrolysis is discharged; and
   a gas-liquid separation unit arranged between the upper part of the electrolytic cell and the sealing cover to separate the electrolytic solution from the gas mixture generated in a bubble-like state in the electrolytic cell,
   wherein the gas-liquid separation unit has bottomed separation chambers divided into a plurality of chambers by partition walls, and
   the partition walls and the bottoms of the chambers are provided with openings.

2. The combustion gas generation device using the electrolysis according to claim 1, further comprising:
   a cooling unit which includes cooling fins connected to both upper and lower portions of the electrolytic cell and is configured to naturally circulate the electrolytic solution in the electrolytic cell.

3. The combustion gas generation device using electrolysis according to claim 2, wherein the combustion gas generation device is configured to be mounted on a vehicle.

4. The combustion gas generation device using electrolysis according to claim 3, wherein the electrolytic cell has a rectangular box-like shape.

5. The combustion gas generation device using the electrolysis according to claim 1, further comprising:
   a second gas-liquid separation unit connected in series to the gas-liquid separation unit to separate a liquid from the gas mixture of hydrogen and oxygen generated from the electrolytic cell.

6. The combustion gas generation device using electrolysis according to claim 5, wherein the combustion gas generation device is configured to be mounted on a vehicle.

7. The combustion gas generation device using electrolysis according to claim 6, wherein the electrolytic cell has a rectangular box-like shape.

8. The combustion gas generation device using electrolysis according to claim 1, wherein the combustion gas generation device is configured to be mounted on a vehicle.

9. The combustion gas generation device using electrolysis according to claim 6, wherein the electrolytic cell has a rectangular box-like shape.

* * * * *